Feb. 24, 1931.  E. A. HALL  1,793,693
VALVE AND BY-PASS
Filed Dec. 30, 1927
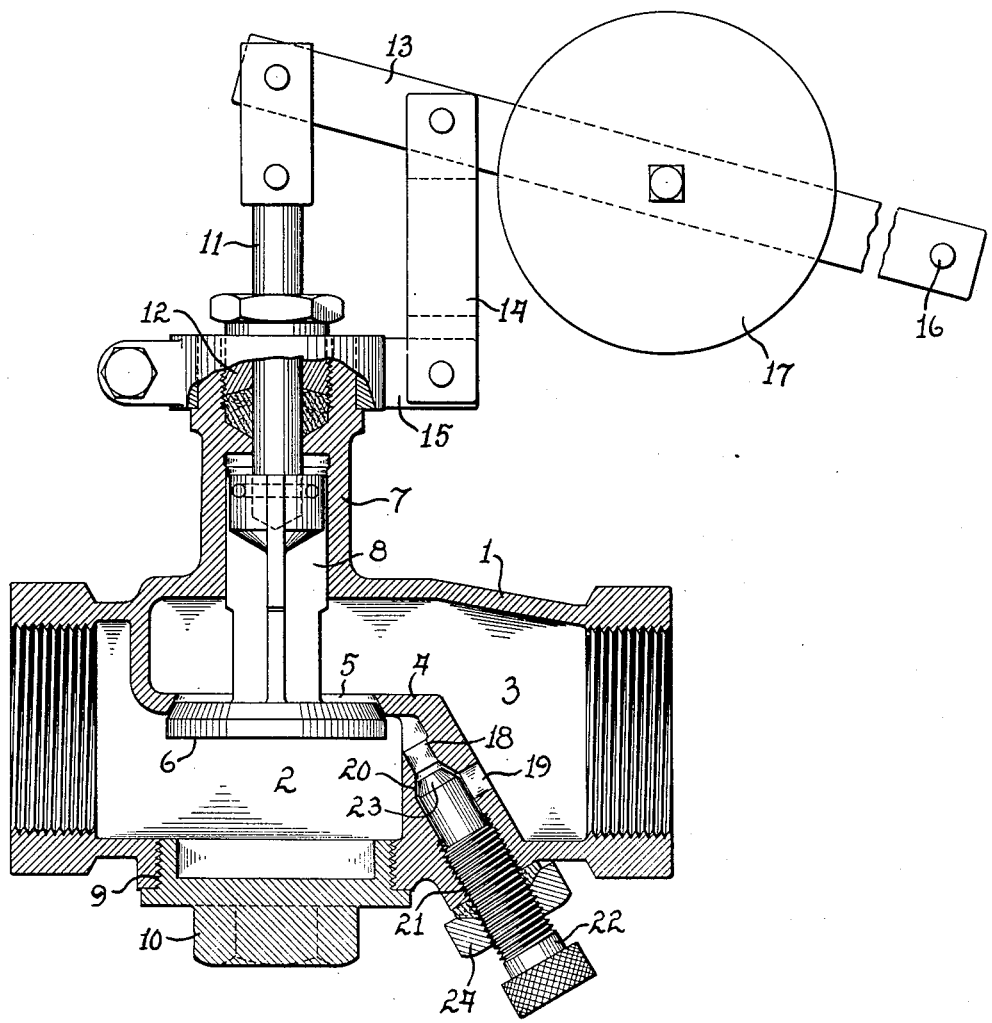
Inventor
Ernest A. Hall,
By Owen & Owen
Attorneys Patented Feb. 24, 1931

1,793,693

UNITED STATES PATENT OFFICE

ERNEST A. HALL, OF TOLEDO, OHIO, ASSIGNOR, BY MESNE ASSIGNMENTS, TO THE COLUMBIA BURNER COMPANY, OF TOLEDO, OHIO, A CORPORATION OF OHIO

VALVE AND BY-PASS

Application filed December 30, 1927. Serial No. 243,498.

This invention relates to a valve adapted to control the flow of gas or other fluid and provided with a restricted by-pass to permit a limited flow around the valve when the latter is completely closed.

The primary object of the invention is to provide a quick acting valve which may be used advantageously in connection with a gas heating plant and controlled from a distance, and at the same time to provide a restricted by-pass for the valve which will at all times permit a sufficient flow of gas to the burner to prevent any possibility of the flame becoming extinguished. It is also desirable to provide a valve for the by-pass, and to make the by-pass large enough so that, by proper adjustment of the by-pass valve, there will be a sufficient flow through the by-pass, when the main valve is completely closed, to provide the proper amount of heat for the mildest days.

The specific construction of the invention, in its preferred form, will be more particularly explained in connection with the accompanying drawing, the single figure of which represents a longitudinal sectional view of the invention.

As illustrated in the drawing, the invention is associated with a valve housing 1 in the form of a pipe coupling adapted to be interposed in the supply line. This housing encloses an inlet chamber 2 and an outlet chamber 3 separated by a partition 4 having an orifice 5, the periphery of which constitutes a seat for a valve 6. The housing is formed with an upstanding sleeve 7 which constitutes a guide within which the stem 8 of the valve 6 is guided. Beneath the valve 6, the housing is formed with an internally threaded opening 9 through which the valve 6 may be inserted into the housing and which is closed by a plug 10.

The valve stem 8 has an extension 11 connected to its upper end and extending above the end of the sleeve 7. The upper end of the sleeve 7 is closed by a packing gland 12 within which the stem extension 11 is guided. A lever 13 for controlling the valve 6 is connected at one end to the upper end of the extension 11. This lever is intermediately fulcrumed on a link 14 which is pivotally supported by the sleeve 7 through the medium of a clip 15 or other suitable means. The lever 13 may be either manually or automatically adjusted by any suitable means connected at 16 to the outer end of the lever. In the form illustrated in the drawing, the lever 13 carries a weight 17 which is heavy enough to overbalance the valve 6 and move it upwardly, and a chain may be connected at 16 and actuated from the floor above to open the valve.

The partition 4 is made comparatively thick at one side of the orifice 5 and is formed with a by-pass 18 leading from the chamber 2 and having a laterally disposed outlet 19 into the chamber 3. The by-pass 18 has an enlarged portion formed with a conical valve seat 20, and in alinement with this enlarged portion is a threaded opening 21 from the outside of the housing. A screw threaded valve 22 is inserted in this threaded opening and terminates at its inner end with a conical head 23 adapted to cooperate with the seat 20. The outer threaded portion of the valve 22 is surrounded by a nut and packing gland 24 to prevent leakage.

Heretofore, in the operation of valves of this type from a remote point, either manually or otherwise, it has been difficult to adjust the valve 6 to a minimum flow without running a chance of extinguishing the flame. After the flame has been extinguished, the valve 6 may be opened again without knowing that such is the case. With the present invention, however, the by-pass valve 22 is adjusted so that it will permit a sufficient flow of gas around the valve 6, when the latter is closed, to insure the maintenance of a flame. In fact it may be desirable to adjust the valve 22 so as to permit a sufficient flow of gas to furnish an appreciable amount of heat. With such an adjustment the valve 6 may be entirely closed on mild days, with the knowledge that there will be just enough flow through the by-pass to furnish the required amount of heat.

By the use of my invention, therefore, it is possible to operate a gas heating plant with the utmost economy as well as safety, and with the least possible attention. While I have shown and described in deail the main valve and the controlling mechanism in connection with which the invention is used, it will be understood that this is merely for the purpose of illustration and that the invention is capable of use in connection with other types of gas or fluid controlled mechanism.

What I claim is:

The combination with a pipe coupling adapted to be disposed horizontally and having an inlet and an outlet with an orifice between them and a vertically reciprocable valve for controlling said orifice, said valve having an upstanding stem, of a by-pass for said orifice, said by-pass having an adjustable restricted opening to permit a limited flow through the coupling when said valve is closed, said coupling being formed with an upstanding sleeve in which said valve stem is guided, said sleeve having a recess in its upper end, a packing gland secured in said recess and also forming a guide for the valve stem, a member secured to and adjustable circumferentially of said sleeve, a lever supported by said member and connected to the valve stem, said lever having a projecting arm operable by an upward pull thereon to open said valve, and means constantly acting on said arm normally tending to close the valve.

In testimony whereof, I have hereunto signed my name to this specification.

ERNEST A. HALL.